(No Model.)
M. LONG.
VALVE.
No. 477,845. Patented June 28, 1892.
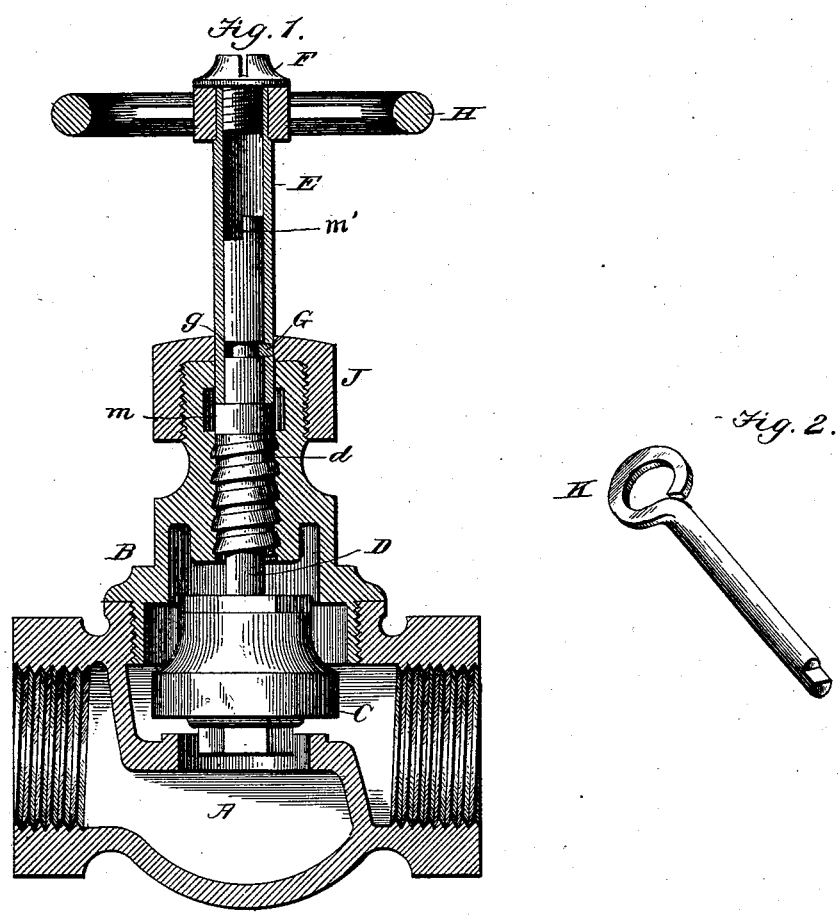
Witnesses
Edwin L. Bradford
Frank H. Thatcher.
Inventor
Michael Long
By Patrick O'Farrell
Attorney

UNITED STATES PATENT OFFICE.

MICHAEL LONG, OF MIDDLETOWN, CONNECTICUT.

VALVE.

SPECIFICATION forming part of Letters Patent No. 477,845, dated June 28, 1892.

Application filed December 8, 1891. Serial No. 414,368. (No model.)

*To all whom it may concern:*

Be it known that I, MICHAEL LONG, a citizen of the United States of America, residing at Middletown, in the county of Middlesex and State of Connecticut, have invented certain new and useful Improvements in Valves, of which the following is a specification, reference being had therein to the accompanying drawings.

My invention relates to valves and belongs to the class in which after the valve is positioned at the desired point it is locked.

The object of my invention is to secure the valve against interference by persons other than those upon whom the duty of operating and adjusting it depends.

My invention is illustrated in the accompanying drawings, in which—

Figure 1 is a vertical sectional view of an ordinary valve, showing my improvement attached. Fig. 2 is a perspective of the valve-key.

Referring to the drawings, A indicates the shell or casing of an ordinary valve; C, the valve; D, the valve-stem, which has a threaded portion $d$ for seating and unseating the valve.

G is a pin inserted in the tubular stem E of the handle H, by which the hollow stem of the handle is connected to the valve-stem by engaging with a groove $g$ in the valve-stem D.

F is a cap-screw which serves the twofold purpose of closing the hollow stem E of handle H and for retaining the handle in position.

J is a nut which when adjusted will retain the pin G in its position in the groove $g$. When the valve is set and the screw F is placed in the end of the tube or stem E, the handle H may be turned freely without disturbing the valve, as the hollow stem only extends down as far as the shoulder $n$ on the valve-stem D, and has its principle bearing in the casing and not on the stem, which permits the tubular stem E to turn freely without imparting any motion to the valve-stem D. It will thus be seen that when the valve is once set it cannot be changed by turning the handle H, but must be done in the following manner: The screw F is removed and the key K inserted into the hollow stem E, where the end of the key which is cut away, as shown at $m$, fits into a similar recess or shoulder formed on the end of the valve-stem D at $m'$. The valve is then regulated by turning the key, which is afterward withdrawn and the screw F replaced and the valve secured against further movement until the person having the key desires to change the adjustment.

Having thus described my invention, what I claim as new, and desire to secure by Letters Patent, is—

In a valve-operating mechanism normally out of engagement, a hollow stem E, provided with a pin G, and a valve-stem D, concentric to said hollow stem and having a recessed end $m'$ and provided with a groove $g$ to receive the pin G, in combination with a screw-cap F, substantially as described.

In testimony whereof I affix my signature in presence of two witnesses.

MICHAEL LONG.

Witnesses:
CHARLES W. VAN PELT,
GEORGE D. FOOTE.